United States Patent [19]

Sanders, Jr. et al.

[11] Patent Number: 5,152,811

[45] Date of Patent: Oct. 6, 1992

[54] META, PARA-BISPHENOL BASED POLYMER GAS SEPARATION MEMBRANES

[75] Inventors: Edgar S. Sanders, Jr., Pittsburg; Raymond W. Mah, Walnut Creek, both of Calif.

[73] Assignee: The Dow Chemical Company, Midland, Mich.

[21] Appl. No.: 812,181

[22] Filed: Dec. 20, 1991

[51] Int. Cl.$^5$ .................. B01D 53/04; B01D 71/50
[52] U.S. Cl. ............................. 55/16; 55/66; 55/68; 55/70; 55/73; 55/158
[58] Field of Search .............. 55/16, 66, 68, 70, 71, 55/73, 158

[56] References Cited

U.S. PATENT DOCUMENTS

| 4,237,259 | 12/1980 | Keeley | 528/204 |
|---|---|---|---|
| 4,268,647 | 5/1981 | Keeley | 525/474 |
| 4,460,798 | 7/1984 | Klopfer et al. | 568/723 |
| 4,818,254 | 4/1989 | Anand et al. | 55/316 |
| 4,822,382 | 4/1989 | Nelson | 55/16 |
| 4,838,904 | 6/1989 | Sanders, Jr. et al. | 55/16 X |
| 4,840,646 | 6/1989 | Anand et al. | 55/16 |
| 4,851,014 | 7/1989 | Jeanes | 55/16 |
| 4,874,401 | 10/1989 | Jeanes | 55/16 |
| 4,900,334 | 2/1990 | Admassu et al. | 55/16 |
| 5,013,332 | 5/1991 | Surnamer et al. | 55/16 |
| 5,055,114 | 10/1991 | Kawakami et al. | 55/16 |

FOREIGN PATENT DOCUMENTS

| 53-066880 | 6/1978 | Japan | 55/16 |
|---|---|---|---|
| 58-008511 | 1/1983 | Japan | 55/158 |
| 59-120206 | 7/1984 | Japan | 55/158 |
| 59-177120 | 10/1984 | Japan | 55/16 |
| 61-271236 | 12/1986 | Japan . | |
| 61-271237 | 12/1986 | Japan . | |
| 63-027290 | 2/1988 | Japan . | |
| 63-265685 | 11/1988 | Japan . | |
| 63-290836 | 11/1988 | Japan . | |
| 1-031824 | 2/1989 | Japan . | |

Primary Examiner—Robert Spitzer
Attorney, Agent, or Firm—Janet Pauline Clark

[57] ABSTRACT

The invention relates to novel meta, parabisphenol based condensation uncross-linked polymer membranes and a method of separating gases using such membranes.

30 Claims, No Drawings

META, PARA-BISPHENOL BASED POLYMER GAS SEPARATION MEMBRANES

BACKGROUND OF THE INVENTION

This invention relates to novel semi-permeable gas separation membranes based upon uncross-linked polymers containing meta, para-bisphenol moieties and a process for separating gases using said membranes.

The use of semi-permeable membranes to separate gases is well known in the art. Membranes have been used to recover or isolate a variety of gases including hydrogen, helium, oxygen, nitrogen, carbon monoxide, carbon dioxide, water vapor, hydrogen sulfide, ammonia, and/or light hydrocarbons. Applications which are of particular interest include the separation of hydrogen or helium from gas mixtures such as mixtures containing nitrogen, carbon monoxide, carbon dioxide, water vapor, and/or light hydrocarbons. For example, the separation and recovery of hydrogen for recycle is often necessary in various hydrocracker, hydrotreater, and catalytic cracking processes used in the oil refinery industry. Other applications of interest include the separation of carbon dioxide from light hydrocarbons or other crude oil components such as hydrogen sulfide as part of the tertiary oil recovery process. Additional applications include the recovery of an enriched oxygen stream from air for use in fermentation processes or to enhance combustion in furnaces. Alternatively, an enriched nitrogen stream may be obtained from air for use as an inert atmosphere over flammable fluids or to enhance the storage longevity of perishable foodstuffs. Membranes can be used to accomplish such separations.

Such membrane separations are based on the relative permeability of two or more gaseous components through the membrane. In order to separate a gas mixture into two portions, one of which is richer and one of which is leaner in at least one gaseous component, the feed mixture is brought into contact with one side of a semi-permeable membrane through which at least one of the gaseous components selectively permeates. A gaseous component which selectively permeates through the membrane passes through the membrane more rapidly than at least one other gaseous component of the mixture. The gas mixture is thus separated into a stream which is enriched in the selectively permeating gaseous component or components and a stream which is depleted in the selectively permeating gaseous component or components. A relatively non-permeating gaseous component passes more slowly through the membrane than at least one other gaseous component of the mixture. An appropriate membrane material is chosen so that some degree of separation of the gas mixture can be achieved.

Membranes for gas separation have been fabricated from a wide variety of natural and synthetic polymeric materials, including rubbers, polysiloxanes, cellulose esters and ethers, aromatic polyimides, polyaramides, polysulfones, polyethersulfones, polyesters, and polycarbonates. An ideal gas separation membrane is characterized by the ability to operate under high temperatures and/or pressures while possessing a high gas separation factor (permselectivity) and high gas permeability. While solvent resistance under operating conditions is also preferred, gas separation membranes are preferably fabricated from polymers which are easily processed. The problem is finding membrane materials which possess all the desired characteristics. Polymers which possess high separation factors generally have low gas permeabilities, while those polymers which possess high gas permeabilities generally have low permselectivities. In the past, a choice between a high gas separation factor and a high gas permeability has been unavoidably necessary. Furthermore, some polymeric membrane materials which would otherwise be considered useful exhibit poor performance under high operating temperatures and pressures. Still other polymeric membrane materials capable of operating at high temperatures and pressures are typically difficult to fabricate into membranes. Solvent resistance is often obtainable only with polymeric materials which are difficult to fabricate into membranes. What is needed is a membrane capable of separating gas mixtures and which possesses a high permselectivity, high gas permeability, flexibility to operate under extreme conditions of temperature and pressure, as well as improved solvent resistance under operating conditions and ease of fabrication.

SUMMARY OF THE INVENTION

The invention is a semi-permeable gas separation membrane comprising a thin discriminating region of an uncross-linked condensation polymer possessing repeat units of the following structure, referred to hereinafter as Formula I:

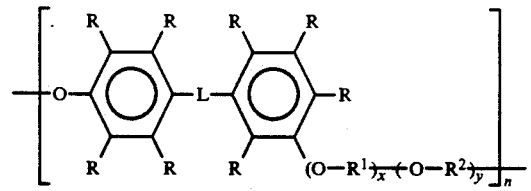

wherein

R is individually in each occurrence selected from the group consisting of a hydrogen radical, a monovalent $C_1$–$C_8$ hydrocarbyl radical, a $C_1$–$C_8$ monovalent halohydrocarbyl radical, a —$NO_2$ radical, a —$SO_3H$ radical, and a halogen;

L is a direct bond or L is a divalent $C_1$–$C_{15}$ hydrocarbyl radical, a divalent $C_1$–$C_{15}$ halohydrocarbyl radical, —S—, —SO—, —$SO_2$—, or —SS—;

$R^1$ is individually in each occurrence selected from the group consisting of —CO—, —CS—, —$SO_2$—,

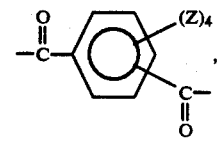

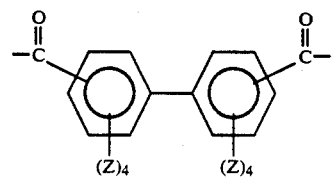

-continued

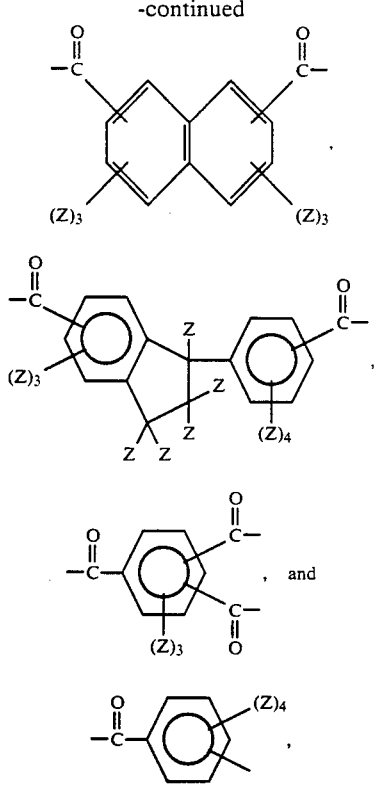

wherein
Z is individually in each occurrence selected from the group consisting of a hydrogen radical, a monovalent $C_1-C_8$ hydrocarbyl radical, a $C_1-C_8$ monovalent halohydrocarbyl radical, a $-NO_2$ radical, a $-SO_3H$ radical, and a halogen;
$R^2$ is:

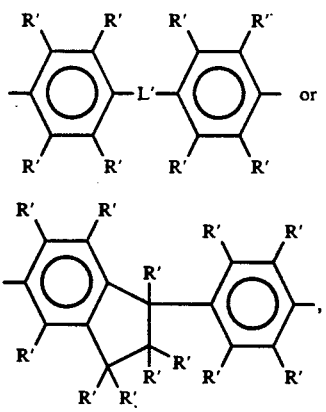

wherein
R' is independently in each occurrence selected from the group consisting of a hydrogen radical, a monovalent $C_1-C_8$ hydrocarbyl radical, a monovalent $C_1-C_8$ halohydrocarbyl radical, a $-NO_2$ radical, a $-SO_3H$ radical, and a halogen, and
L' is a direct bond or L' is a divalent $C_1-C_{15}$ hydrocarbyl radical, a divalent $C_1-C_{15}$ halohydrocarbyl radical, $-O-$, $-S-$, $-SO-$, $-SO_2-$, or $-SS-$;
x is a positive integer between 0 and 1 inclusive;
y is a positive integer between 0 and 1 inclusive; and
n is a positive integer representing a degree of polymerization which provides a number-average molecular weight of at least about 3,000.

In another aspect, the invention is a process of separating gases comprising:

A. contacting one side of a semi-permeable gas separation membrane with a feed gas mixture under pressure, wherein the membrane divides a separation chamber into a high pressure side into which the feed gas mixture is fed and a low pressure side;

B. maintaining a pressure differential across the membrane under conditions such that at least one gaseous component in the feed gas mixture selectively permeates through the membrane from the high pressure side to the low pressure side of the membrane;

C. removing from the low pressure side of the membrane permeated gas which is enriched in at least one selectively permeating gaseous component;

D. removing from the high pressure side of the membrane non-permeated gas which is depleted in at least one selectively permeating gaseous component;

wherein the membrane comprises a thin discriminating region of an uncross-linked condensation polymer possessing repeat units corresponding to Formula I.

The membranes of this invention possess good gas permselectivity and gas permeability, reasonable mechanical strength, and good temperature resistance. The membranes can be endowed with good solvent resistance and are readily fabricated.

DETAILED DESCRIPTION OF THE INVENTION

The gas separation membranes of this invention are fabricated from uncross-linked polymers containing meta, para-bisphenol moieties and preferably comprise polycarbonates, polythiocarbonates, polyestercarbonates, polyesters, polyetheresters, polysulfones, and polyethers based upon 3,4'-dihydroxybisphenolic monomers, 3,4'-dihydroxybisphenolic monomers, and 4,4'-dihydroxybisphenolic monomers.

R is preferably selected from the group consisting of a hydrogen radical, a monovalent $C_1-C_8$ hydrocarbyl radical, a monovalent $C_1-C_8$ halohydrocarbyl radical, a $-NO_2$ radical, a $-SO_3H$ radical, and a halogen. More preferably, R is selected from the group consisting of a hydrogen radical, a monovalent $C_1-C_8$ hydrocarbyl radical, a $C_1-C_8$ halohydrocarbyl radical, and a halogen. Even more preferably, R is selected from the group consisting of a hydrogen radical, a monovalent $C_1-C_4$ hydrocarbyl radical, a monovalent $C_1-C_4$ halohydrocarbyl radical, and a halogen. Preferred halogens are fluorine, chlorine, bromine, and iodine; more preferred halogens are fluorine, chlorine, and bromine; most preferred halogens are chlorine and bromine.

L preferably is a direct bond, a divalent $C_1-C_{15}$ hydrocarbyl radical, a divalent $C_1-C_{15}$ halohydrocarbyl radical, $-S-$, $-SO-$, $-SO_2-$, or $-SS-$. L more preferably is a direct bond, a divalent $C_1-C_{15}$ hydrocarbyl radical, or a divalent $C_1-C_{15}$ halohydrocarbyl radical. Even more preferably, L is a divalent $C_1-C_6$ hydrocarbyl radical or a divalent $C_1-C_6$ halohydrocarbyl radical. Preferred halohydrocarbyl radicals include $-C_7H_5Cl-$ and $-CCl_2-$.

Preferably, $R^1$ is individually in each occurrence selected from the group consisting of $-CO-$, $-CS-$, $-SO_2-$, $-COC_6Z_4CO-$, $-COC_6Z_4C_6Z_4CO-$, $-COC_{10}Z_6CO-$, $-COC_{15}Z_{12}CO-$, $-COC_6Z_3(CO)_2-$, and $-COC_6Z_4-$. More preferably, $R^1$ is individually in each occurrence selected from the group consisting of —CO—, —CS—, —COC$_6$Z$_4$CO—, —COC$_6$Z$_4$C$_6$Z$_4$CO—, —COC$_{10}$Z$_6$CO—, and —COC$_{15}$Z$_{12}$CO—. Most preferably, R$^1$ is individually in each occurrence selected from the group consisting of —CO—, —CS—, —COC$_6$Z$_4$CO—, and —COC$_{15}$Z$_{12}$CO—.

Z preferably is individually in each occurrence selected from the group consisting of a hydrogen radical, a monovalent C$_1$-C$_8$ hydrocarbyl radical, a C$_1$-C$_8$ monovalent halohydrocarbyl radical, a —NO$_2$ radical, a —SO$_3$H radical, and a halogen. Z more preferably is individually in each occurrence selected from the group consisting of a hydrogen radical, a monovalent C$_1$-C$_8$ hydrocarbyl radical, a C$_1$-C$_8$ monovalent halohydrocarbyl radical, and a halogen. Z most preferably is individually in each occurrence selected from the group consisting of a hydrogen radical, a monovalent C$_1$-C$_4$ hydrocarbyl radical, a monovalent C$_1$-C$_4$ halohydrocarbyl radical, and a halogen.

R' preferably is independently in each occurrence selected from the group consisting of a hydrogen radical, a monovalent C$_1$-C$_8$ hydrocarbyl radical, a monovalent C$_1$-C$_8$ halohydrocarbyl radical, a —NO$_2$ radical, a —SO$_3$H radical, and a halogen. More preferably, R' is selected from the group consisting of a hydrogen radical, a monovalent C$_1$-C$_4$ hydrocarbyl radical, a monovalent C$_1$-C$_4$ halohydrocarbyl radical, and a halogen. Preferred halogens are fluorine, chlorine, bromine, and iodine; more preferred halogens are fluorine, chlorine, and bromine; most preferred halogens are chlorine and bromine.

L' preferably is a direct bond, a divalent C$_1$-C$_{15}$ hydrocarbyl radical, a divalent C$_1$-C$_{15}$ halohydrocarbyl radical, —O—, —S—, —SO—, —SO$_2$—, or —SS—. L' more preferably is a direct bond, a divalent C$_1$-C$_8$ hydrocarbyl radical, a divalent C$_1$-C$_8$ halohydrocarbyl radical, —O—, —S—, —SO—, or —SO$_2$—. L' most preferably is a direct bond, a divalent C$_1$-C$_4$ hydrocarbyl radical, a divalent C$_1$-C$_4$ halohydrocarbyl radical, —O—, —S—, —SO—, or —SO$_2$—. Preferred halohydrocarbyl radicals are —C$_7$H$_5$Cl— and —CCl$_2$—.

x is preferably a positive integer between about 0 and 1 inclusive, more preferably between about 0.33 and 1 inclusive, even more preferably between about 0.67 and 1 inclusive, and most preferably about 1.

y is preferably a positive integer between about 0 and 1 inclusive, more preferably between about 0 and 0.75 inclusive, even more preferably between about 0 and 0.50 inclusive, and most preferably between about 0 and 0.25 inclusive.

n is preferably a positive integer between about 10 and about 2,000, more preferably between about 40 and about 1,000.

The condensation polymers useful in this invention may be prepared by the reaction of a bisphenol with phosgene, thiophosgene, sulfuric acid, or other aromatic acid such as terephthalic acid, isophthalic acid, or 3-tert-butyl isophthalic acid, or their derivatives such as terephthaloyl chloride, isophthaloyl chloride, or hydroxy benzoic acid, or a combination thereof. The starting materials may be individual monomeric species as well as oligomeric species of the previously described compositions. The polymerization may be accomplished by the use of a homogeneous solution technique wherein the starting material and an optional monofunctional terminating species are dissolved in a suitable organic solvent, such as methylene chloride in the presence of a base, such as pyridine, and condensed with a gaseous, liquid, or solid condensing species. The reaction is preferably carried out in a dry inert atmosphere such a dry nitrogen or argon and at temperatures between about 0° C. and the boiling point of the solvent. Upon completion of the polymerization, the reaction mixture is acidified with a dilute solution of an acid such as hydrochloric acid, washed with water to remove residual pyridinium salts, passed through an ion exchange column to remove residual entrained water, and precipitated in a non-solvent such as heptane. The precipitated polymer is recovered by filtration, optionally air dried, and subsequently dried under vacuum at elevated temperature.

The polymerization may also be accomplished by the use of a heterogeneous interfacial technique wherein the starting material and an optional monofunctional terminating species are dissolved in a solution of base, such as sodium hydroxide, and an organic solvent, such as methylene chloride, which solvates the gaseous, liquid, or solid condensing species as well as the polymerized product, and is facilitated by the use of a phase transfer catalyst, such a tetrabutyl-ammonium bromide, or by the use of an amine catalyst, such as dimethylamino pyridine. The reaction is also preferably carried out in a dry inert atmosphere, such as dry nitrogen or argon, and at a temperature between about 0° C. and the boiling points of both the aqueous solvent and organic solvent. Upon completion of the polymerization, the reaction mixture is acidified with a dilute solution of an acid, such as hydrochloric acid, the separated polymer containing organic phase is washed with water to remove residual sodium salts, passed through a coalescer or dried using a drying agent, such as magnesium sulfate, to remove residual entrained water, and precipitated in a non-solvent such as heptane. The precipitated polymer is recovered by filtration, optionally air dried, and subsequently dried under vacuum at elevated temperature.

The uncross-linked polymers so formed possess a number-average molecular weight (M$_n$) such that the polymers are useful for forming fibers, films, molded articles, foams, coatings, and the like. The number-average molecular weight of such polymers as measured by gel permeation chromatography based upon polystyrene standards is preferably at least about 3,000, more preferably at least about 10,000; the number-average molecular weight of such polymers is preferably less than about 500,000, more preferably less than about 250,000. The weight-average molecular weight of such polymers as measured by gel permeation chromatography based upon polystyrene standards is preferably at least about 6,000, more preferably at least about 20,000; the weight-average molecular weight of such polymers is preferably less than about 1,000,000, more preferably less than about 500,000. The intrinsic viscosity of such polymers is preferably between about 0.1 and about 2.0 deciliters per gram, more preferably between about 0.2 and 1.0 deciliters per gram, as measured in a chlorinated hydrocarbon solvent such as methylene chloride. The uncross-linked polymers of this invention are preferably soluble in common chlorinated hydrocarbon solvents such as methylene chloride, chloroform, and chlorobenzene, as well as common dipolar aprotic solvents such as N-methyl-2-pyrrolidinone, dimethylacetamide, dimethylformamide, dimethylsulfoxide, and sulfolane.

The uncross-linked polymers useful in this invention preferably possess glass transition temperatures of at least about 50° C., more preferably of at least about 70° C., even more preferably of at least about 90° C. The polymers preferably possess a tensile strength as measured by ASTM D-1708 of at least about 4,000 psi (27,580 kPa), more preferably of at least about 6,000 psi (41,370 kPa); the polymers also preferably possess a tensile modulus as measured by ASTM D-1708 of at least about 100 kpsi (689,475 kPa), more preferably of at least about 150 kpsi (1,034,215 kPa). The polymers preferably possess an elongation at break as measured by ASTM D-1708 of at least about 2 percent, more preferably of at least about 4 percent.

Such uncross-linked polymers are used to fabricate the semi-permeable membranes of this invention. The membranes of this invention may be formed into any useful configuration known to one skilled in the art. In particular, the membranes may be shaped in the form of flat sheets or films, hollow fibers of various cross-sectional shapes, or hollow tubes. Films and hollow fibers of substantially circular cross-section are preferred membrane configurations.

In addition, the membranes of this invention may possess any morphological structure known to one skilled in the art. In particular, the membrane may be a homogeneous membrane, a composite membrane, or an asymmetric membrane. Asymmetric and composite membranes are preferred; asymmetric membranes are more preferred. In the embodiment wherein the membranes possess a hollow fiber configuration, asymmetric membranes may have the discriminating region either on the outside of the hollow fiber, at the inside (lumen) surface of the hollow fiber, or located somewhere internal to both outside and inside hollow fiber membrane surfaces. In the embodiment wherein the discriminating region of the hollow fiber membranes is internal to both hollow fiber membrane surfaces, the inside surface and the outside surface of the hollow fiber membranes are porous, yet the membranes demonstrate gas discriminating ability, that is, the ability to separate gases.

Homogeneous membranes are prepared by forming a continuous thin discriminating layer which is dense and free of voids and pores. Such membranes possess a discriminating region which generally has substantially the same structure and composition throughout the membrane. In one preferred embodiment, the uncross-linked polymers useful in this invention are dissolved in a solvent, thus forming a polymer/solvent solution which is cast onto a uniform surface from which the membrane may thereafter be readily separated. Preferred casting solvents for the polymers useful in this invention include chlorinated solvents such as methylene chloride and chloroform, and dipolar aprotic solvents such as N-methyl-2-pyrrolidinone, N,N-dimethylacetamide, and dimethylformamide. The polymer/solvent solution should be substantially homogeneous and possess sufficient viscosity to allow casting of the solution onto a uniform surface. Preferably, the solution of polymer/solvent contains polymer in weight percents of between about 5 and about 50, more preferably of between about 10 and about 40, even more preferably of between about 10 and about 30.

The solution is cast onto a uniform surface possessing a low surface energy such as silicone or coated glass, or a surface to which the membrane will not adhere such as mercury, or a liquid with which the polymer is substantially immiscible, such as water. Alternatively, the membrane may be cast onto a surface which may be dissolved away from the membrane following curing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby leaving a thin discriminating layer of polymer which is homogeneous. The solution may be cured or dried either by exposure to a vacuum, exposure to elevated temperatures, by allowing the solvent to evaporate over time, or any combination thereof. Generally, it is preferable to expose the cast solution to elevated temperatures which are below the glass transition temperature (Tg) of the polymer, preferably less than about Tg-100° C., more preferably less than about Tg-50° C., even more preferably less than about Tg-20° C.

Composite membranes are prepared by forming a continuous thin discriminating layer of the polymer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the polymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Examples of such porous polymeric membranes suitable as porous supporting layers in composite membranes include commercially available porous cellulose ester and polysulfone porous membranes. Other preferred porous supporting layers include porous membranes fabricated from polycarbonates, polyester-carbonates, polyimides, and polyethersulfones. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes may be prepared by forming a thin discriminating layer on a porous supporting layer.

Such membranes possess a discriminating layer which generally has the same composition but a different structure than the porous supporting layer. To prepare an asymmetric membrane, a solution of uncross-linked polymer, solvent, and optional non-solvent is formed and cast as hereinbefore described for homogeneous membranes. Preferred non-solvents for use in this invention include alcohols such as methanol, hydrocarbons such as heptane, and $C_2$-$C_6$ glycols. The cast solution is partially cured to remove a portion of the solvent and optional non-solvent. Thereafter, one or both surfaces of the partially cured membrane is contacted with a non-solvent for the polymer such as water so as to form a thin discriminating layer on one or both sides of the membrane while substantially removing the solvent and optional non-solvent from the membrane. The porous supporting layer formed provides support for the thin discriminating layer without significantly impeding the transport of gas through the membrane. The drying step is performed in a manner similar to that described hereinbefore with respect to the formation of homogeneous membranes. Alternatively, an asymmetric membrane with two porous surfaces and an internal discriminating region may be formed.

Flat sheet, tubular, and hollow fiber membranes which are homogeneous, composite, or asymmetric may be formed by extrusion from an appropriate solution of the uncross-linked polymer in a solvent and optional non-solvent. Such extrusion processes are well known to those skilled in the art and the formation of such membranes requires the adaptation of the hereinbefore described techniques.

Extrusion is a preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer. Alternatively, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The uncross-linked polymer, solvent, and optional non-solvent mixture is heated to a temperature at which the mixture becomes a substantially homogeneous fluid. The substantially homogeneous fluid is then extruded through a sheet, hollow tube, or hollow fiber die (spinnerette). Hollow fiber spinnerettes are typically multiholed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the polymer such as water. Following extrusion, the membrane is treated as hereinbefore described for homogeneous, composite, or asymmetric membranes.

In one preferred embodiment, the membranes are annealed before use. The membrane is preferably exposed to temperatures above about 50° C. and below about 300° C. for a period of time to partially densify the polymer. This procedure may optionally be performed under vacuum.

Preferably, the homogeneous membranes useful in this invention have a thickness of between about 5 microns and about 500 microns, more preferably between about 10 microns and about 150 microns. Hollow fiber homogeneous membranes preferably have an outer diameter of between about 50 microns and about 800 microns, more preferably between about 100 microns and about 300 microns. Preferably, the effective discriminating layer in composite or asymmetric membranes has a thickness of between about 0.02 microns and about 10 microns, more preferably between about 0.02 microns and about 2 microns. Preferably, the supporting layer in composite or asymmetric membranes possesses a thickness of between about 5 microns and about 500 microns, more preferably between about 10 microns and about 150 microns. Hollow fiber composite or asymmetric membranes preferably have an outer diameter in the range of from about 50 microns to about 800 microns, more preferably in the range of from about 100 microns to about 300 microns.

The membranes are fabricated into flat sheet, spiral wound, tubular, or hollow fiber devices by methods known in the art. See U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; 4,666,469; 4,707,167; 4,752,305; 4,758,341; 4,871,379; 4,929,259; 4,961,760; 5,013,331; and 5,013,437; the relevant portions of each patent relating to device fabrication incorporated herein by reference for all legal purposes which may be served thereby.

The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane.

The membrane divides the separation chamber into two regions, a high pressure side into which the feed gas mixture is introduced and a low pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the gas mixture selectively permeates through the membrane more rapidly than the other gaseous component or components in the gas mixture. Gas which is enriched in the selectively permeating gaseous component or components is thus obtained on the low pressure side of the membrane which is removed from the low pressure side of the membrane as permeate. Gas depleted in the selectively permeating gaseous component or components is obtained on the high pressure side of the membrane which is removed from the high pressure side of the membrane as non-permeate.

Gas permeability is defined as $$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$10^{-10} \frac{(\text{centimeter})^3 \, (\text{STP}) \, (\text{centimeter})}{(\text{centimeter})^2 \, (\text{second}) \, (\text{centimeter Hg})},$$

abbreviated hereinafter as $10^{-10} \frac{cm^3 \, (STP) \, cm}{cm^2 s \, cmHg}$.

The reduced gas flux is defined as (permeability)÷(membrane thickness). A standard reduced flux unit is $$10^{-6} \frac{(\text{centimeter})^3 \, (\text{STP})}{(\text{centimeter})^2 \, (\text{second}) \, (\text{centimeter Hg})},$$

abbreviated hereinafter as $10^{-6} \frac{cm^3 \, (STP)}{cm^2 s \, cmHg}$.

Alpha, the gas separation factor or gas selectivity, is defined as the ratio of the permeability or flux of the faster permeating gas to the permeability or flux of the slower permeating gas.

The membranes of this invention are particularly useful for separating gas mixtures containing at least one gas selected from the group consisting of hydrogen, helium, oxygen, nitrogen, carbon monoxide, carbon dioxide, argon, water vapor, hydrogen sulfide, ammonia, nitrogen oxides, sulfur oxides, and light hydrocarbons. As used herein, the term light hydrocarbons refers to gaseous saturated and unsaturated $C_{1-4}$ hydrocarbons such as methane, ethane, ethylene, propane, propylene, butane, and butylene.

Preferably, the membranes useful in this invention exhibit a permselectivity of an oxygen/nitrogen gas mixture at about 30° C. of about 2.5, more preferably about 3.5, and even more preferably about 4.0. Preferably, the membranes have a permeability for oxygen at about 30° C. of 0.01 Barrer, more preferably about 0.05 Barrer, and even more preferably about 0.1 Barrer. Preferably, the membranes have a reduced gas flux for oxygen at about 30° C. of $$1.0 \times 10^{-9} \frac{cm^3 \, (STP)}{cm^2 s \, cmHg}, \text{ more preferably}$$

$$5.0 \times 10^{-9} \frac{cm^3 \, (STP)}{cm^2 s \, cmHg}, \text{ and most preferably}$$

$$1.0 \times 10^{-8} \frac{cm^3 \, (STP)}{cm^2 s \, cmHg}.$$

Preferably, the membranes useful in this invention exhibit a permselectivity of a helium/methane gas mixture at about 30° C. of about 20°, more preferably about 35°, most preferably about 50°. Preferably, the membranes have a permeability for helium at about 30° C. of about 2.0 Barrers, more preferably about 3.5 Barrers, most preferably about 5.0 Barrers. Preferably, the membranes have a reduced gas flux for helium at about 30° C. of about $$1.0 \times 10^{-8} \frac{cm^3 \, (STP)}{cm^2 s \, cmHg}, \text{ more preferably about}$$

$$5.0 \times 10^{-8} \frac{cm^3 \, (STP)}{cm^2 s \, cmHg}, \text{ and most preferably about}$$

$$1.0 \times 10^{-7} \frac{cm^3 \, (STP)}{cm^2 s \, cmHg}.$$

The separation process is carried out at pressure and temperatures which do not deleteriously affect the membrane. Preferably, the pressure on the high pressure side of the membrane is between about 10 psig (69 kPa) and about 1,000 psig (6,895 kPa), more preferably between about 50 psig (345 kPa) and about 500 psig (3,447 kPa). The temperature of the feed gas mixture is preferably between about −50° C. and about 100° C., more preferably between about −20° C. and about 100° C. The temperature of the membrane is independent of the temperature of the feed and is preferably between about −50° C. and 100° C., more preferably between about −20° C. and about 80° C.

The membrane devices used in the process of this invention may be arranged in parallel, series, recycle, or cascade configurations. The membrane separation process of this invention may be combined with non-membrane separation processes such as cryogenic distillation and pressure or temperature swing adsorption.

SPECIFIC EMBODIMENTS

The following Examples are included to illustrate the invention and are not intended to limit the scope of the invention or claims.

Monomer Synthesis

EXAMPLE 1

Preparation of 2,2-Bis(3-bromo-4-hydroxyphenyl-4'-bromo-3'-hydroxyphenyl)propane About 10.95 grams (48 mmoles) of 2,2-bis(4-hydroxyphenyl-3'-hydroxyphenyl)propane were dissolved in a 500 milliliter Erlenmeyer flask containing a magnetic stir bar and about 100 milliliters of methylene chloride and about 5 milliliters of methanol. Aliquots of bromine solution (5 milliliters of $Br_2$ diluted to 100 milliliters with methylene chloride) were added to the solution over a period of about 20 minutes. The extent of reaction was monitored using an HP 5890 Gas Chromatograph equiped with a 5 foot (1.5 meter) HP-1 methyl silicone gum column. Two product peaks were obtained. Additionally, a small aliquot of product was removed from the reaction mixture, extracted with aqueous sodium sulfite, dried with magnesium sulfate, and derivatized with a small amount of acetyl chloride in the presence of pyridine. The derivatized product was analyzed using an HP 1090 Liquid Chromatograph equipped with a Spheri-10 RP-18 column. Once again, two product peaks were obtained (6.48 minutes (major, derivatized dibromo species) and 7.38 minutes (minor)). The sample mixture was isolated as a gummy, tacky solid.

EXAMPLE 2

Preparation of 2,2-Bis(3,5-dibromo-4-hydroxyphenyl-4'6'-dibromo-3'-hydroxyphenyl) propane About 10.95 grams (48 mmoles) of 2,2-bis(4-hydroxyphenyl-3'-hydroxyphenyl)propane were dissolved in a 500 milliliter Erlenmeyer flask containing a magnetic stir bar and about 100 milliliters of methylene chloride and about 5 milliliters of methanol. Aliquots of bromine solution (10 milliliters of $Br_2$ diluted to 100 milliliters with methylene chloride) were added to the solution over a period of several hours. The extent of reaction was monitored using an HP 5890 Gas Chromatograph equiped with a 5 foot (1.5 meter) HP-1 methyl silicone gum column. Three product peaks were obtained. Additionally, a small aliquot of product was removed from the reaction mixture, extracted with aqueous sodium sulfite, dried with magnesium sulfate, and derivatized with a small amount of acetyl chloride in the presence of pyridine. The derivatized product was analyzed using an HP 1090 Liquid Chromatograph equipped with a Spheri-10 RP-18 column. Once again, three product peaks were obtained (7.38 minutes (minor), 7.82 minutes (minor), and 8.15 minutes (major)). The sample was isolated as a white, free flowing, powdery solid after recrystallization from methanol/water.

Polymer Synthesis

EXAMPLE 3

Preparation of Poly(2,2-bis(4-hydroxyphenyl-3'-hydroxyphenyl)-propane)carbonate About 10 grams (43.8 mmoles) of white, powdery 2,2,bis(4-hydroxyphenyl-3'-hydroxyphenyl)propane were weighed and transferred to a three-neck, 500 milliliter round bottom flask equipped with a stirrer, sparge tube for dry nitrogen, and a pH electrode. About 7.4 grams (92.5 mmoles) of 50 percent NaOH solution was diluted to a volume of 50 milliliters with water and transferred to the flask. Stirring was initiated and the solid was dissolved within a few minutes. Fifty milliliters of methylene chloride was added to the flask and stirring was continued. An addition funnel was fitted to the flask and 41 milliliters of phosgene/methylene chloride (96.4 mmoles of 2.32M solution) was transferred to the funnel. Phosgene solution was added dropwise to the stirred solution over a period of about 20 minutes while maintaining the pH of the aqueous phase at about 10.5 with occasional additions of 1N NaOH. When the phosgene addition was complete, the aqueous phase was tested for the presence of phenates (negative) and the organic phase was tested for chloroformates (positive). Eighty milligrams (0.7 mmoles) of N,N-dimethylaminopyridine was weighed and added at once to the heterogeneous mixture. Slowly, the acidity began to increase; the pH was maintained at about 9 with the addition of 1N NaOH. The reaction was judged complete when no chloroformates could be detected in the organic phase. The reaction mixture was acidified with 1N HCl, washed with water and phase separated. The organic phase was dried using magnesium sulfate and the clear water-white was precipitated in 4 volumes of heptane. The fluffy white solid was air dried, then oven dried under vacuum at 80° C. overnight.

A small sample of dried polymer (about 125 milligrams) was dissolved in a 25 milliliter volumetric flask with methylene chloride. Size exclusion analysis was performed using a Hewlett Packard 1090 Liquid Chromatograph equipped with a pair of duPont Zorbax PSM Trimodal columns and a diode array detector. The eluting solvent was HPLC grade tetrahydrofuran (THF). The calibration curve was established using narrow standard polystyrene samples monitored at 254 nm. The sample was found to have a weight-average molecular weight (Mw) of about 75,000.

EXAMPLE 4

Preparation of Poly(2,2-bis(3-bromo-4-hydroxyphenyl-4'-bromo-3'-hydroxyphenyl)propane)carbonate About 5 grams (13 mmoles) of the 2,2-bis(3-bromo-4-hydroxyphenyl-4'-bromo-3'-hydroxyphenyl)propane were weighed into a 100 milliliter screw-cap bottle and dissolved in methylene chloride (25 milliliters) and 25 milliliters of 1N aqueous sodium hydroxide (25 mmoles). Phosgene in methylene chloride (2.32M, 10 milliliters) was added to the mixture. The mixture was then shaken for ten minutes. Additional aqueous sodium hydroxide was added to maintain the alkalinity (pH approximately 10). When the aqueous phase was found to be free of phenates, a small amount of N,N-dimethylaminopyridine (16 milligrams, 0.13 mmoles) was added to the mixture and vigorous shaking was continued. After 10 minutes, additional aqueous sodium hydroxide solution was added to the mixture to maintain the alkalinity (pH approximately 10). During this period, a small volume of phosgene solution (2.32M, 2 milliliters) was also added to the mixture. Vigorous shaking was once more initiated and continued until the milky emulsion thickened into a massive gumlike liquid. The contents were transferred to a Waring blender, further diluted with methylene chloride and water, and stirred for several minutes. The mixture was acidified with dilute acid (1N HCl). The stirring was then stopped and the mixture was allowed to separate into two liquid phases. The aqueous phase was discarded and the organic phase was washed with water. The hazy organic solution was then dried over anhydrous magnesium sulfate and filtered through a Celite bed on a fritted glass filter. The clear solution was reduced in volume and precipitated in four volumes of heptane. The white, fiberous solid was air dried and oven dried under vacuum at 80° C. for sixteen hours.

A small sample of dried polymer (about 125 milligrams) was dissolved in a 25 milliliter volumetric flask with methylene chloride. The poly(2,2-bis(3-bromo-4-hydroxyphenyl-4'-bromo-3'-hydroxyphenyl)propane) carbonate sample was analyzed and found to have a number-average molecular weight (Mn) of about 85, 975 and a weight-average molecular weight (Mw) of about 439, 539.

EXAMPLE 5

Preparation of Poly(2,2-bis(3,5 dibromo-4-hydroxyphenyl-4'6'-dibromo-3'-hydroxyphenyl)propane)carbonate The process of Example 4 was repeated with the exception that about 7.07 grams (13 mmoles) of 2,2-bis(3,5-dibromo-4-hydroxy-4'6'-dibromo-3'-hydroxyphenyl)propane was used in place of 2,2-bis(3-bromo-4-hydroxyphenyl-4'-bromo-3'-hydroxyphenyl)propane.

EXAMPLE 6

Preparation of
Poly(2,2-bis(4-hydroxyphenyl-3'-hydroxyphenyl)-
propane)terephthaloyl-co-isophthaloyl ester carbonate
(E/C=2/1, T/I=8/2)

A three neck, 250 milliliter round bottom flask, equipped with a stirrer, nitrogen sparge tube, and an addition funnel, was charged with about 5.00 grams (21.9 mmoles) of 2,2-bis(4-hydroxyphenyl-3'-hydroxyphenyl)propane, 50 milliliters of methylene chloride, and 5 milliliters (62 mmoles) of pyridine. The resultant clear, colorless solution was stirred under nitrogen for 10 minutes. A mixture of terephthaloyl chloride, about 1.776 grams (8.75 mmoles), and isophthaloyl chloride, about 0.440 grams (2.17 mmoles), was dissolved in 20 milliliters of methylene chloride and transferred to an addition funnel. An aliquot of phosgene/methylene chloride solution, about 5.0 milliliters (12.2 mmoles), was also transferred to the addition funnel. The flask was immersed in a water bath and moderate stirring of the solution was continued while the acid chloride/phosgene solution was added dropwise over a period of 15 minutes. When the addition was complete, an additional 0.2 grams (1 mmole) of 2,2-bis(4-hydroxyphenyl-3'-hydroxyphenyl)propane was added to the stirring solution, followed by the slow addition of 2 milliliters of phosgene/methylene chloride solution. Stirring was continued for another 30 minutes.

The viscous solution was diluted with 50 milliliters of methylene chloride, washed with 30 milliliters of 1N, HCl, and transferred to a separatory funnel. The organic phase was washed twice again with water. The colorless, water-wet organic phase was dried with magnesium sulfate and filtered through Celite to yield a clear, colorless solution. The polymer was found to have a weight-average molecular weight (Mw) of about 102,000 and a number-average molecular weight (Mn) of about 27,700, based on polystyrene standards and a polydispersity of 3.7.

EXAMPLE 7

Preparation of
Poly(2,2-bis(4-hydroxyphenyl)propane)carbonate

Comparative Example

The process of Example 3 was repeated with the exception that about 10 grams (43.8 mmoles) of 2,2-bis(4-hydroxyphenyl)propane was used.

EXAMPLE 8

Preparation of
Poly(2,2-bis(3,5-dibromo-4-hydroxyphenyl)propane)-
carbonate

Comparative Example

The process of Example 3 was repeated with the exception that about 23.8 grams (43.8 mmoles) of 2,2-bis(3,5-dibromo-4-hydroxyphenyl)propane was used.

Membrane Preparation

The polymers of Examples 3, 4, 5, and 6 were used to prepare membranes therefrom. Films were obtained by casting about 20 weight percent polymer solution onto glass plates, allowing the solutions to slowly devolatilize, removing the films from the glass plates, and placing the films in a heated vacuum oven to remove residual solvent.

The gas permeabilities of nitrogen, oxygen, helium, methane, and carbon dioxide were measured on a dense film having a diameter of about 3.8 centimeters using a constant-volume, variable-pressure apparatus. The permeability coefficients were measured at about 25° C. using a feed pressure of about 50 psig (340 kPa). Performance data for the membranes are reported in Table I.

TABLE I

| Example | P $O_2$ (Barrers) | Alpha $O_2/N_2$ | P He (Barrers) | Alpha $He/CH_4$ | P $He/C_2H_4$ (Barrers) | Alpha $He/C_2H_6$ |
| --- | --- | --- | --- | --- | --- | --- |
| 3 | 0.3 | 4.3 | 5.8 | 109 | 223 | 1160 |
| 4 | 0.15 | 9.1 | 5.7 | 630 | 630 | >2000 |
| 5 | 0.9 | 8.2 | 16 | 180 | 157 | 1500 |
| 6 | — | — | — | — | — | — |
| 7 | 1.6 | 4.8 | 13 | 35 | — | — |
| 8 | 1.2 | 8.3 | 16 | 150 | 86 | 380 |

What is claimed is:

1. A process of separating gases comprising:

A. contacting one side of a semi-permeable gas separation membrane with a feed gas mixture under pressure, wherein the membrane divides a separation chamber into a high pressure side into which the feed gas mixture is fed and a low pressure side;

B. maintaining a pressure differential across the membrane under conditions such that at least one gaseous component in the feed gas mixture selectively permeates through the membrane from the high pressure side to the low pressure side of the membrane;

C. removing from the low pressure side of the membrane permeated gas which is enriched in at least one selectively permeating gaseous component; and D. removing from the high pressure side of the membrane non-permeated gas which is depleted in at least one selectively permeating gaseous component;

wherein the membrane comprises a thin discriminating region of an uncross-linked condensation polymer possessing repeat units of the structure:

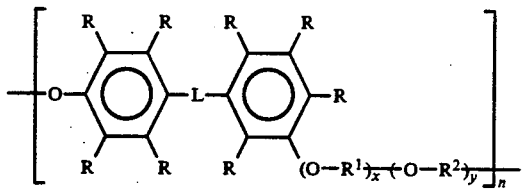

wherein
R is individually in each occurrence selected from the group consisting of a hydrogen radical, a monovalent $C_1$-$C_8$ hydrocarbyl radical, a $C_1$-$C_8$ monovalent halohydrocarbyl radical, a —$NO_2$ radical, a —$SO_3H$ radical, and a halogen;
L is a direct bond or L is a divalent $C_1$-$C_{15}$ hydrocarbyl radical, a divalent $C_1$-$C_{15}$ halohydrocarbyl radical, —S—, —SO—, —$SO_2$—, or —SS—; and
$R^1$ is individually in each occurrence selected from the group consisting of —CO—, —CS—, —$SO_2$—,

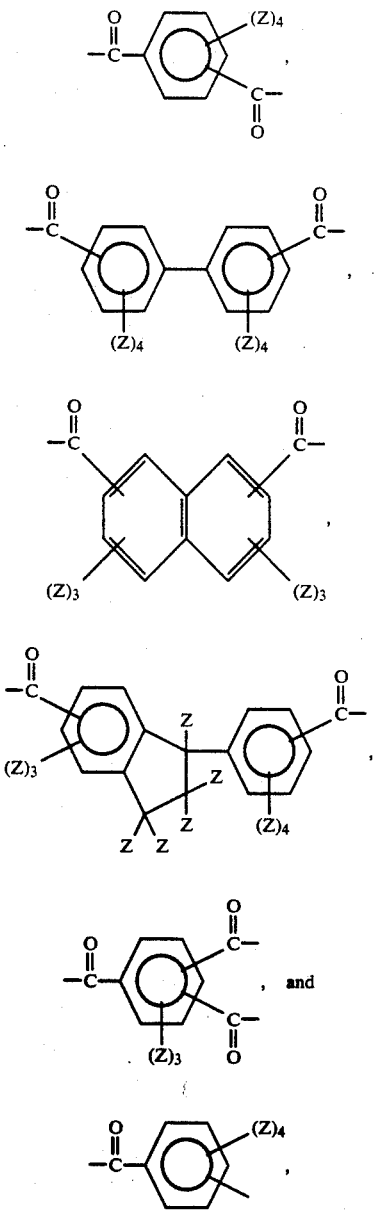

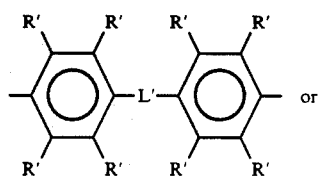

wherein
Z is individually in each occurrence selected from the group consisting of a hydrogen radical, a monovalent $C_1$-$C_8$ hydrocarbyl radical, a $C_1$-$C_8$ monovalent halohydrocarbyl radical, a —$NO_2$ radical, a —$SO_3H$ radical, and a halogen;

$R^2$ is:

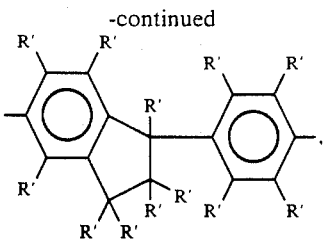

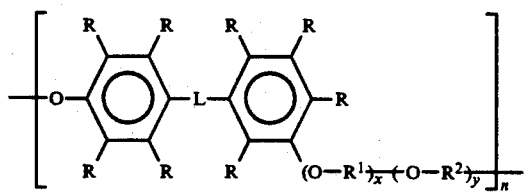

wherein
R' is independently in each occurrence selected from the group consisting of a hydrogen radical, a monovalent $C_1$-$C_8$ hydrocarbyl radical, a monovalent $C_1$-$C_8$ halohydrocarbyl radical, a —$NO_2$ radical, a —$SO_3H$ radical, and a halogen, and L' is a direct bond or L' is a divalent $C_1$-$C_{15}$ hydrocarbyl radical, a divalent $C_1$-$C_{15}$ halohydrocarbyl radical, —O—, —S—, —SO—, —$SO_2$—, or —SS—;

x is a positive integer between 0 and 1 inclusive;
y is a positive integer between 0 and 1 inclusive; and
n is a positive integer representing a degree of polymerization which provides a number-average molecular weight of at least about 3,000.

2. The process of claim 1 wherein the feed gas mixture contains at least one of the gases selected from the group consisting of hydrogen, helium, oxygen, nitrogen, argon, carbon monoxide, carbon dioxide, water vapor, hydrogen sulfide, nitrogen oxides, sulfur oxides, ammonia, and light hydrocarbons.

3. The process of claim 1 wherein the pressure of the feed gas mixture is between about 5 psig and about 1,000 psig.

4. The process of claim 1 wherein the temperature of the feed gas mixture is between about −50° C. and about 100° C.

5. The process of claim 1 wherein the temperature of the membrane is between about −50° C. and 100° C.

6. A semi-permeable gas separation membrane comprising a thin discriminating region of an uncross-linked condensation polymer possessing repeat units of the structure:

$$\left[ -O-\underset{\underset{R\ R\ R}{\ }}{\overset{\overset{R\ R\ R\ R}{\ }}{\bigcirc}}-L-\underset{\underset{R\ R\ R}{\ }}{\overset{\overset{R\ R}{\ }}{\bigcirc}}-R \quad (O-R^1)_{\overline{x}}(O-R^2)_{\overline{y}} \right]_n$$

wherein
R is individually in each occurrence selected from the group consisting of a hydrogen radical, a monovalent $C_1$-$C_8$ hydrocarbyl radical, a $C_1$-$C_8$ monovalent halohydrocarbyl radical, a —$NO_2$ radical, a —$SO_3H$ radical, and a halogen;
L is a direct bond or L is a divalent $C_1$-$C_{15}$ hydrocarbyl radical, a divalent $C_1$-$C_{15}$ halohydrocarbyl radical, —S—, —SO—, —$SO_2$—, or —SS—;
$R^1$ is individually in each occurrence selected from the group consisting of —CO—, —CS—, —$SO_2$—,

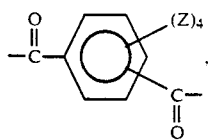

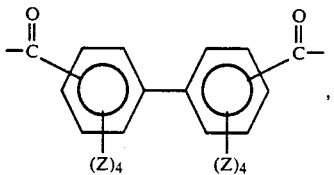

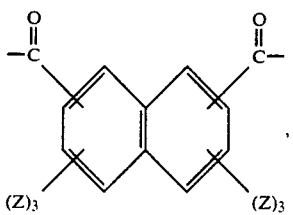

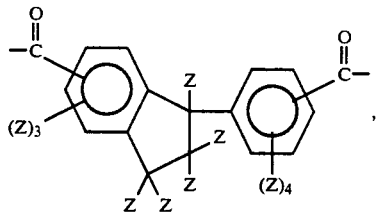

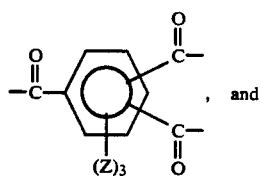

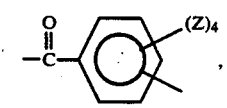

, and

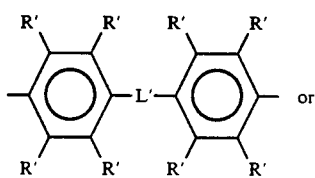

wherein

Z is individually in each occurrence selected from the group consisting of a hydrogen radical, a monovalent $C_1$–$C_8$ hydrocarbyl radical, a $C_1$–$C_8$ monovalent halohydrocarbyl radical, a —$NO_2$ radical, a —$SO_3H$ radical, and a halogen;

$R^2$ is:

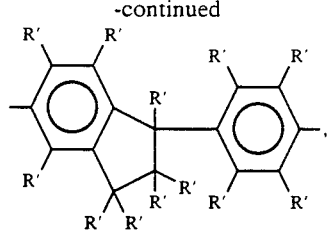

-continued

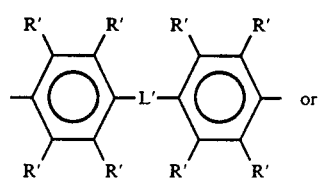

wherein

R' is independently in each occurrence selected from the group consisting of a hydrogen radical, a monovalent $C_1$–$C_8$ hydrocarbyl radical, a monovalent $C_1$–$C_8$ halohydrocarbyl radical, a —$NO_2$ radical, a —$SO_3H$ radical, and a halogen, and L' is a direct bond or L' is a divalent $C_1$–$C_{15}$ hydrocarbyl radical, a divalent $C_1$–$C_{15}$ halohydrocarbyl radical, —O—, —S—, —SO—, —$SO_2$—, or —SS—;

x is a positive integer between 0 and 1 inclusive;

y is a positive integer between 0 and 1 inclusive; and n is a positive integer representing a degree of polymerization which provides a number-average molecular weight of at least about 3,000.

7. The membrane of claim 6 wherein R is individually in each occurrence selected from the group consisting of a hydrogen radical, a monovalent $C_1$–$C_8$ hydrocarbyl radical, a $C_1$–$C_8$ monovalent halohydrocarbyl radical, and a halogen.

8. The membrane of claim 7 wherein R is individually in each occurrence selected from the group consisting of a hydrogen radical, a monovalent $C_1$–$C_4$ hydrocarbyl radical, a $C_1$–$C_4$ monovalent halohydrocarbyl radical, and a halogen.

9. The membrane of claim 7 wherein the halogens are chlorine and bromine.

10. The membrane of claim 6 wherein L is a direct bond or L is a divalent $C_1$–$C_{15}$ hydrocarbyl radical or a divalent $C_1$–$C_{15}$ halohydrocarbyl radical.

11. The membrane of claim 10 wherein L is a divalent $C_1$–$C_6$ hydrocarbyl radical or a divalent $C_1$–$C_6$ halohydrocarbyl radical.

12. The membrane of claim 6 wherein $R^1$ is individually in each occurrence selected from the group consisting of —CO—, —CS—, —$COC_6Z_4CO$—, and —$COC_{15}Z_{12}CO$—, wherein Z is individually in each occurrence selected from the group consisting of a hydrogen radical, a monovalent $C_1$–$C_4$ hydrocarbyl radical, a $C_1$–$C_4$ monovalent halohydrocarbyl radical, and a halogen.

13. The membrane of claim 6 wherein $R^2$ is:

-continued

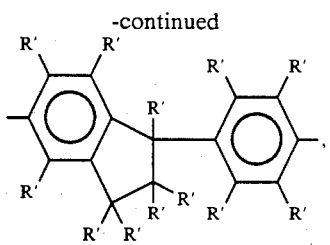

wherein
R' is independently in each occurrence selected from the group consisting of a hydrogen radical, a monovalent $C_1$-$C_4$ hydrocarbyl radical, a monovalent $C_1$-$C_4$ halohydrocarbyl radical, and a halogen.

14. The membrane of claim 13 wherein the halogens are bromine and chlorine.

15. The membrane of claim 6 wherein L' is a direct bond or L' is a divalent $C_1$-$C_8$ hydrocarbyl radical, a divalent $C_1$-$C_8$ halohydrocarbyl radical, —O—, —S—, —SO—, or —SO$_2$—.

16. The membrane of claim 15 wherein L' is a direct bond or L' is a divalent $C_1$-$C_4$ hydrocarbyl radical, a divalent $C_1$-$C_4$ halohydrocarbyl radical, —O—, —S—, —SO—, or —SO$_2$—.

17. The membrane of claim 6 wherein x is a positive integer between about 0.33 and 1 inclusive.

18. The membrane of claim 17 wherein x is a positive integer between about 0.67 and 1 inclusive.

19. The membrane of claim 6 wherein y is a positive integer between about 0 and 0.75 inclusive.

20. The membrane of claim 19 wherein y is a positive integer between about 0 and 0.50 inclusive.

21. The membrane of claim 20 wherein y is a positive integer between about 0 and 0.25 inclusive.

22. The membrane of claim 6 wherein n is a positive integer between about 10 and about 2,000.

23. The membrane of claim 6 wherein the membrane is composite or asymmetric.

24. The membrane of claim 6 wherein the membrane is a hollow fiber.

25. The membrane of claim 6 wherein the permselectivity for oxygen/nitrogen at about 30° C. is at least about 4.0.

26. The membrane of claim 25 wherein the permeability for oxygen at about 30° C. is at least about 0.1 Barrier.

27. The membrane of claim 25 wherein the reduced gas flux for oxygen at about 30° C. is at least about $$1.0 \times 10^{-8} \frac{cm^3 \, (STP)}{cm^2 s \, cmHg}.$$

28. The membrane of claim 6 wherein the permselectivity for helium/methane at about 30° C. is at least about 50°.

29. The membrane of claim 28 wherein the permeability for helium at about 30° C. is at least about 5.0 Barrers.

30. The membrane of claim 28 wherein the reduced gas flux for helium at about 30° C. is at least about $$1.0 \times 10^{-7} \frac{cm^3 \, (STP)}{cm^2 s \, cmHg}.$$

* * * * *